(12) United States Patent
Stevens et al.

(10) Patent No.: US 10,808,558 B2
(45) Date of Patent: Oct. 20, 2020

(54) SUPPORT RING WITH THERMAL HEAT SHIELD FOR CASE FLANGE

(71) Applicant: UNITED TECHNOLOGIES CORPORATION, Farmington, CT (US)

(72) Inventors: Michael S. Stevens, Alfred, ME (US); Christine F. McGinnis, New Britain, CT (US); Major D. Jones, Royal Palm Beach, FL (US); Judith F. Brooks, Palo Alto, CA (US); Brian Duguay, Berwick, ME (US); Tomasz Pelic, Krzemienica (PL)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 273 days.

(21) Appl. No.: 15/982,714

(22) Filed: May 17, 2018

(65) Prior Publication Data

US 2019/0353043 A1    Nov. 21, 2019

(51) Int. Cl.
  *F01D 9/04* (2006.01)
  *F01D 9/02* (2006.01)
  *F02K 3/06* (2006.01)

(52) U.S. Cl.
  CPC ............. *F01D 9/042* (2013.01); *F01D 9/023* (2013.01); *F02K 3/06* (2013.01); *F05D 2220/3213* (2013.01); *F05D 2230/60* (2013.01); *F05D 2240/12* (2013.01); *F05D 2240/15* (2013.01)

(58) Field of Classification Search
  CPC ......... F05D 2240/15; F05D 2220/3213; F05D 2220/3212
  See application file for complete search history.

(56) References Cited

U.S. PATENT DOCUMENTS

| 4,566,851 A * | 1/1986 | Comeau ............... F01D 25/246 415/139 |
| 8,459,941 B2 | 6/2013 | Jasko et al. |
| 9,297,536 B2 * | 3/2016 | Eastwood ................. F23R 3/50 |

(Continued)

FOREIGN PATENT DOCUMENTS

| EP | 2474707 | 7/2012 |
| EP | 3306056 | 4/2018 |

OTHER PUBLICATIONS

European Patent Office, European Search Report dated Oct. 9, 2019 in Application No. 19174592.6.

*Primary Examiner* — Igor Kershteyn
*Assistant Examiner* — Juan G Flores
(74) *Attorney, Agent, or Firm* — Snell & Wilmer L.L.P.

(57) ABSTRACT

A heat shield vane support may have a structure including at least one of a cylindrical and a frustoconical portion with an outboard diameter and an inboard diameter extending about an axis and extending axially between a forward face and an aft face and may comprise a flange extending circumferentially about the aft face radially inward from the inboard diameter, a plurality of anti-rotation features distributed circumferentially about the inboard diameter extending radially inward from the inboard diameter and extending axially with respect to the cylindrical structure between a forward edge and an aft edge defining a length L, and a plurality of teeth distributed circumferentially about the forward face and extending axially from the forward face.

18 Claims, 6 Drawing Sheets

(56) References Cited

U.S. PATENT DOCUMENTS

2017/0292702 A1  10/2017  Sander et al.
2017/0292704 A1  10/2017  Sander et al.
2017/0336074 A1  11/2017  Sander et al.

* cited by examiner

SUPPORT RING WITH THERMAL HEAT SHIELD FOR CASE FLANGE

FIELD

The disclosure relates generally to coupling interfaces between fluid transfer systems in gas turbine engines.

BACKGROUND

Gas turbine engines may comprise cases surrounding hot section components such as a combustor diffuser case and a high pressure turbine case. In various embodiments, component cases may be coupled to each other at mating flanges. Relatively hot air may flow inside the case and relatively cool air may flow outside the case tending to induce a thermal gradient between the inner diameter of the case and the outer diameter of the case and between the mating flanges. In various embodiments, the thermal gradient tends to induce stresses within the case and the mating flanges tending thereby to reduce component lifetime.

SUMMARY

In various embodiments the present disclosure provides a heat shield vane support may have a structure including at least one of a cylindrical and a frustoconical portion with an outboard diameter and an inboard diameter extending about an axis and extending axially between a forward face and an aft face, comprising a flange extending circumferentially about the aft face radially inward from the inboard diameter, a plurality of anti-rotation features distributed circumferentially about the inboard diameter extending radially inward from the inboard diameter and extending axially with respect to the cylindrical structure between a forward edge and an aft edge, and a plurality of teeth distributed circumferentially about the forward face and extending axially from the forward face.

In various embodiments, a flow discouraging rail extends circumferentially about the aft face radially outward from the outboard diameter. In various embodiments, the plurality of anti-rotation features comprises a first thickness defined between a first channel and a second channel, wherein the first channel and the second channel are cut radially outboard from the inboard diameter toward the outboard diameter, wherein the first channel and the second channel extend axially over a portion of the inboard diameter of the cylindrical structure and parallel the axis. In various embodiments, the plurality of anti-rotation features comprise a clocking feature proximate the forward edge of the plurality of anti-rotation features, wherein the clocking feature defines a second thickness, wherein the second thickness is less than the first thickness, wherein the clocking feature describes a stepped transition between the first thickness and the second thickness. In various embodiments, a plurality of tooling features distributed circumferentially about the outboard diameter extend radially from the outboard diameter. In various embodiments, each tooling feature in the plurality of tooling features extend from a portion of the outboard diameter defined radially outward of the plurality of anti-rotation features. In various embodiments, the flange comprises a port. In various embodiments, the flange comprises a gasket support ring at a distal end of the flange from the inboard diameter, wherein the gasket support ring extends circumferentially about the distal end of the flange and axially aft of the flange.

In various embodiments, the present disclosure provides a gas turbine engine comprising a compressor section configured to compress a gas, a combustor section aft of the compressor section configured to combust the gas and comprising a diffuser case having a diffuser case flange, a torque takeout ring, and a compression ring aft of the torque takeout ring, a turbine section aft of the combustor section configured to extract work from the combusted gas, the turbine section having a turbine case coupled to the diffuser case at an interface between the diffuser case flange and a turbine case flange and a heat shield vane support radially inward of the interface between the diffuser case flange and the turbine case flange, the heat shield vane support having a structure including at least one of a cylindrical and a frustoconical portion with an outboard diameter and an inboard diameter extending about an axis and extending axially between a forward face and an aft face, comprising a flange extending circumferentially about the aft face radially inward from the inboard diameter, a plurality of anti-rotation features distributed circumferentially about the inboard diameter extending radially inward from the inboard diameter and extending axially with respect to the cylindrical structure between a forward edge and an aft edge, and a plurality of teeth distributed circumferentially about the forward face and extending axially from the forward face.

In various embodiments, a flow discouraging rail extends circumferentially about the aft face radially outward from the outboard diameter. In various embodiments, the plurality of anti-rotation features comprises a first thickness defined between a first channel and a second channel, wherein the first channel and the second channel are cut radially outboard from the inboard diameter toward the outboard diameter, wherein the first channel and the second channel extend axially over a portion of the inboard diameter of the cylindrical structure and parallel the axis. In various embodiments, the plurality of anti-rotation features comprise a clocking feature proximate the forward edge of the plurality of anti-rotation features, wherein the clocking feature defines a second thickness, wherein the second thickness is less than the first thickness, wherein the clocking feature describes a stepped transition between the first thickness and the second thickness. In various embodiments, a plurality of tooling features distributed circumferentially about the outboard diameter extend radially from the outboard diameter. In various embodiments, each tooling feature in the plurality of tooling features extend from a portion of the outboard diameter defined radially outward of the plurality of anti-rotation features. In various embodiments, the flange comprises a port. In various embodiments, the flange comprises a gasket support ring at a distal end of the flange from the inboard diameter, wherein the gasket support ring extends circumferentially about the distal end of the flange and axially aft of the flange. In various embodiments, each of the plurality of teeth are disposed within a notch of the torque takeout ring. In various embodiments, a first interference between the compression ring and the outboard diameter tends to retain the heat shield vane support axially with respect to the diffuser case flange. In various embodiments, a yoke of a vane is disposed about each of the plurality of anti-rotation features, wherein a second interference between the yoke and each of the plurality of anti-rotation features inhibits rotation of the vane about a radial axis of the vane.

In various embodiments, the present disclosure provides a method of assembling a vane assembly comprising inserting a heat shield vane support having a structure including at least one of a cylindrical and a frustoconical portion with an outboard diameter and an inboard diameter extending about an axis and extending axially between a forward face and an aft face into a bypass duct of a diffuser case having a diffuser case flange, wherein the forward face is proximate a torque takeout ring, wherein the diffuser case flange lies between the forward face and the aft face and radially outward of the outboard diameter, inserting each of a plurality of teeth extending from the forward face through each of a plurality of notches of the torque takeout ring, compressing the cylindrical structure of the heat shield vane support and generating an interference retaining the heat shield vane support axially with respect to the diffuser case flange, and disposing a yoke of a vane about each of a plurality of anti-rotation features of the heat shield vane support distributed circumferentially about the inboard diameter, wherein the plurality of anti-rotation features extend radially inward from the inboard diameter and extend axially with respect to the cylindrical structure between a forward edge and an aft edge.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements. Accordingly, elements with like element numbering may be shown in the figures, but may not be necessarily be repeated herein for the sake of clarity.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of a gas turbine engine. As used herein, "forward" refers to the direction associated with the intake (e.g., the front end) of a gas turbine engine. The term "upstream" is used to refer to directions and positions located closer to the source than directions and positions referenced as "downstream."

As used herein, "distal" refers to the direction outward, or generally, away from a reference component. As used herein, "proximate" refers to a direction inward, or generally, towards a reference component. A first component that is "radially outward" or "outboard" of a second component means that the first component is positioned at a greater distance away from a central longitudinal axis of the gas turbine engine. A first component that is "radially inward" or "inboard" of a second component means that the first component is positioned closer to the engine central longitudinal axis than the second component. The terminology "radially outward" and "radially inward" may also be used relative to references other than the engine central longitudinal axis.

Figure 1:
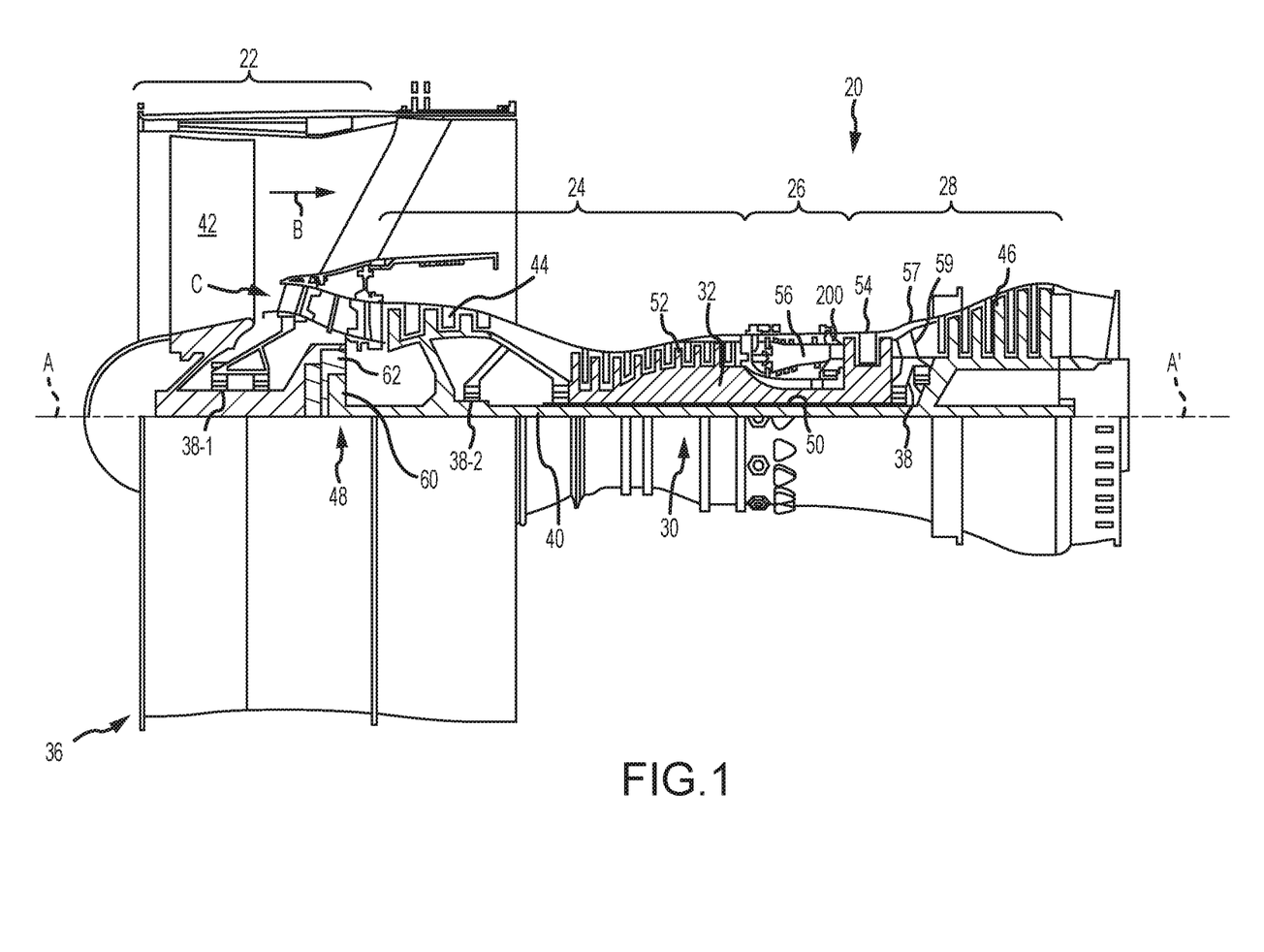
FIG. 1 illustrates a schematic cross-section of an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. In operation, fan section 22 can drive air along a bypass flow-path B while compressor section 24 can drive air for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including turbojet engines, a low-bypass turbofans, a high bypass turbofans, or any other gas turbine known to those skilled in the art including single spool and three-spool architectures.

Figure 2:
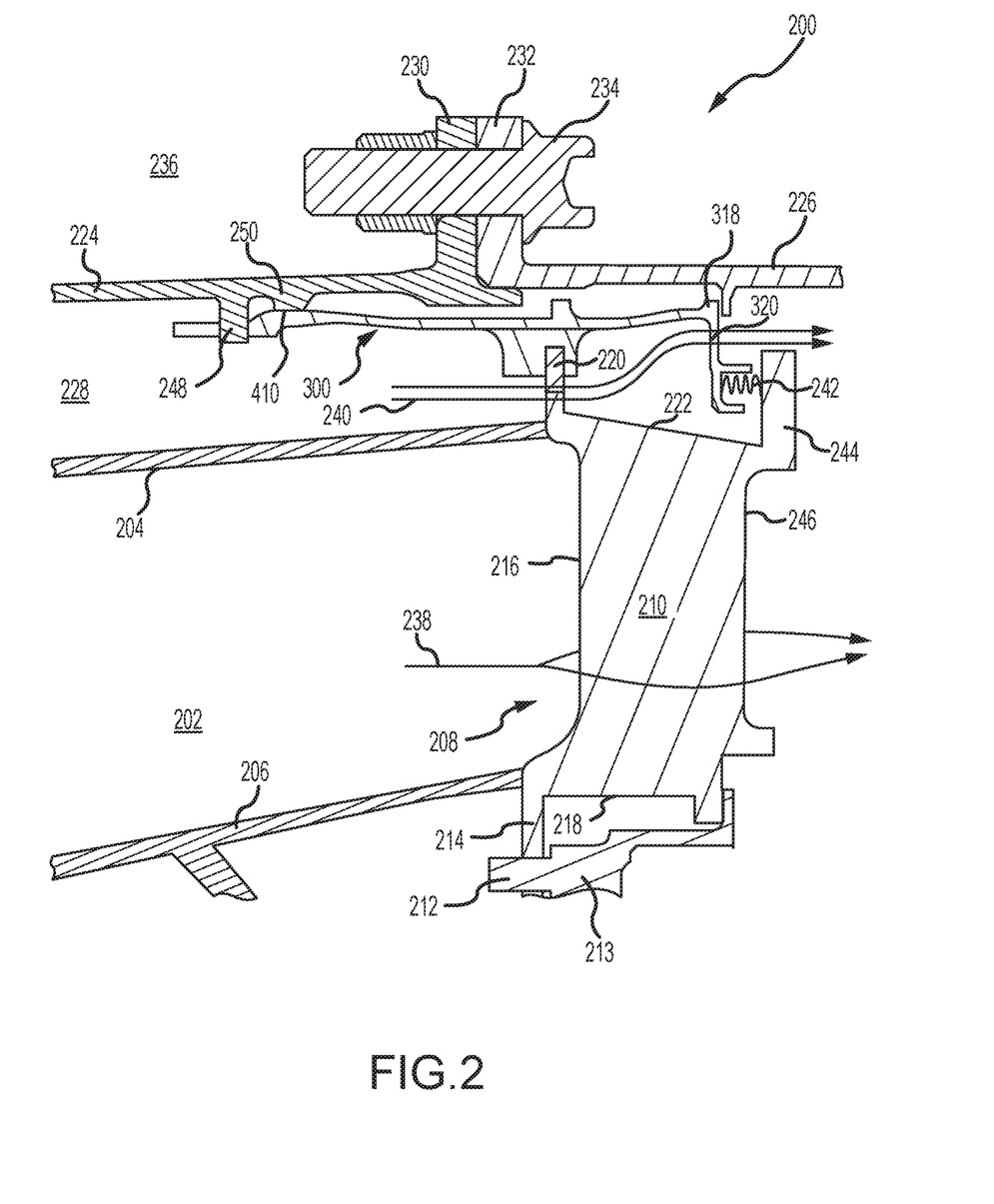
FIG. 2 illustrates a cross sectional view of a vane assembly comprising a heat shield vane support, in accordance with various embodiments.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2 in FIG. 2). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 62 enclosed within a gear housing 62. Gear assembly 62 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46, and high pressure turbine 54 rotationally drive the respective low speed spool 30 and high speed spool 32 in response to the expansion.

In various embodiments, HPC 52 may comprise alternating rows of rotating rotors and stationary stators. Stators may have a cantilevered configuration or a shrouded configuration. More specifically, a stator may comprise a stator vane, a casing support and a hub support. In this regard, a stator vane may be supported along an outer diameter by a casing support and along an inner diameter by a hub support. In contrast, a cantilevered stator may comprise a stator vane that is only retained and/or supported at the casing (e.g., along an outer diameter).

In various embodiments, rotors may be configured to compress and spin a fluid flow. Stators may be configured to receive and straighten the fluid flow. In operation, the fluid flow discharged from the trailing edge of stators may be straightened (e.g., the flow may be directed in a substantially parallel path to the centerline of the engine and/or HPC) to increase and/or improve the efficiency of the engine and, more specifically, to achieve maximum and/or near maximum compression and efficiency when the straightened air is compressed and spun by rotor 64.

According to various embodiments and with reference to FIGS. 1 and 2, combustor section 26 may further comprise a vane assembly 200 comprising a heat shield vane support 300. In various embodiments, vane assembly 200 comprises vanes 210 disposed proximate the exit plane 208 of combustion chamber 202. In various embodiments, combustion chamber 202 may be an annular structure defined between an inboard chamber wall 206 and an outboard chamber wall 204. In various embodiments, vanes 210 extend across the exit plane 208 between inboard chamber wall 206 and outboard chamber wall 204. In various embodiments, vanes 210 may be coupled at exit plane 208 by pins 212 of support boss 213 through vane flange 214 proximate leading edge 216 at an inboard end 218 of vane 210 and by yoke 220 proximate leading edge 216 at outboard end 222 of vane 210. In various embodiments, a diffuser case 224 and a turbine case 226 define a combustor bypass duct 228 outboard of outboard chamber wall 204. In various embodiments, diffuser case 224 and turbine case 226 are joined at an interface between diffuser case flange 230 and turbine case flange 232 by fasteners 234. In various embodiments, an outer chamber 236 may be defined outboard of diffuser case 224 and turbine case 226 and inboard of an engine case. In various embodiments, diffuser case 224 further comprises a torque takeout ring 248 extending radially into combustor bypass duct 228 about an inboard circumference of the diffuser case 224. In various embodiments and in like regard, a compression ring 250 extends into combustor bypass duct 228 aft of the torque takeout ring 248.

Figure 3A:
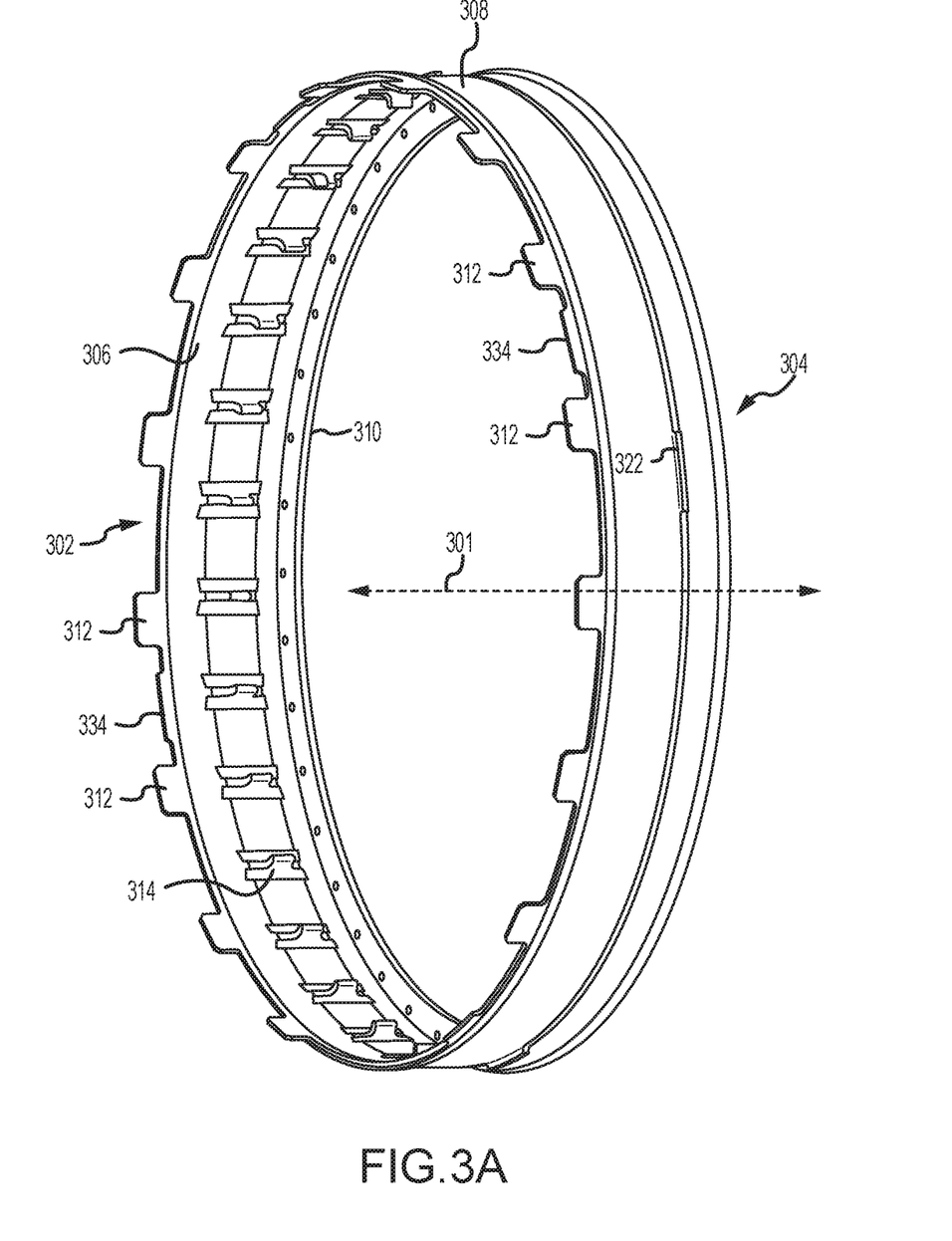
FIG. 3A illustrates a perspective view of a heat shield vane support, in accordance with various embodiments.
Figure 3B:
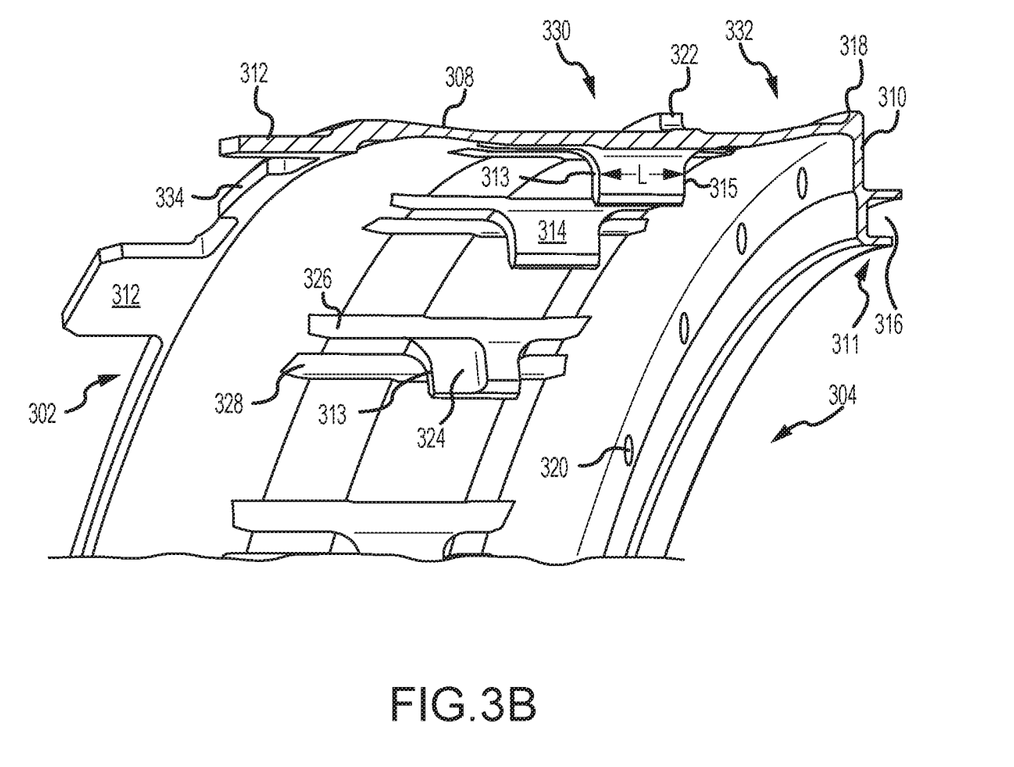
FIG. 3B illustrates a section through a perspective view of a heat shield vane support, in accordance with various embodiments.

In various embodiments and with additional reference to FIGS. 3A and 3B, heat shield vane support 300 comprises a structure centered about an axis 301 and extending along axis 301 between forward face 302 and aft face 304 and having an inboard diameter 306 and an outboard diameter 308. In various embodiments, the structure of heat shield vane support 300 may be substantially cylindrical and comprise at least one of a cylindrical portion 330 and a frustoconical portion 332 coaxial with the cylindrical portion. In various embodiments, the structure may comprise a plurality of coaxial cylindrical portions and frustoconical portions. In various embodiments, a flange 310 extends circumferentially about aft face 304 radially inward from inboard diameter 306 and a flow discouraging rail 318 extends circumferentially about aft face 304 radially outward from outboard diameter 308. In various embodiments, a gasket support ring 316 is located at a distal end 311 of flange 310 from the inboard diameter 306 of the cylindrical structure of heat shield vane support 300 and extends circumferentially about the distal end 311 of flange 310 axially aft of flange 310. In various embodiments, a plurality of anti-rotation features 314 distributed circumferentially about inboard diameter 306 extend radially inward of inboard diameter 306 and extending axially, parallel to axis 301 of the cylindrical structure, between a forward edge 313 and an aft edge 315 of anti-rotation features 314 over a portion of the inboard diameter defining length L therebetween. In various embodiments an anti-rotation feature may have a first thickness defined between a pair of channels such as first channel 326 and second channel 328 which extend axially over a portion of the inboard diameter 306 and parallel to the axis 301. In various embodiments, an anti-rotation feature 314 may comprise a clocking feature 324 proximate the forward edge 313. Clocking feature 324 may comprise a flat portion of length L cut relatively into the first thickness of the anti-rotation feature 314 at a forward edge 313 of the anti-rotation feature 314 and, in that regard, clocking feature 324 defines a second thickness less than the first thickness and describes a stepped transition (processing from the forward edge 313 toward the aft edge 315) between the first thickness and the second thickness of the anti-rotation feature 314. In various embodiments the first channel 326 and second channel 328 may be cut from inboard diameter 306 radially outboard toward outboard diameter 308. In various embodiments, a plurality of teeth 312 distributed circumferentially about forward face 302 may extend axially from forward face 302 forward along axis 301. In various embodiments, a plurality of axial locating features 334 interspersed relatively between the plurality of teeth 312 may extend axially from forward face 302 forward along axis 301. In various embodiments, each of the plurality of axial locating features 334 may have a circumferential extent about the forward face 302 describing a sector of greater area than that described by each of the plurality of teeth 312. In various embodiments, each of the plurality of axial locating features 334 may have a axial extent from the forward face 302 less than that of each of the plurality of teeth 312. In various embodiments, a plurality of tooling features 322 may comprise a tab or protrusion extending radially from outboard diameter 308 about the circumference of outboard diameter 308 and may be distributed circumferentially about outboard diameter 308. In various embodiments, tooling features 322 may be located axially about outboard diameter 308 along a portion of outboard diameter 308 defined radially outward of the axial extension (length L) of the anti-rotation features 314.

In various embodiments and with continued reference to FIGS. 1 through 3B, hot gasses 238 flow from combustion chamber 202 downstream across vanes 210 and tend to heat vanes 210 and outboard chamber wall 204. In various embodiments, relatively cooler combustor bypass air 240 may flow downstream through combustor bypass duct 228, along the inboard diameter 306 of heat shield vane support 300, over outboard end 222 of vanes 210, and pass through ports 320 of heat shield vane support 300. In various embodiments, outer chamber 236 may contain relatively cold air tending thereby to induce a thermal gradient, proportional to the temperature difference between the outer chamber air and the combustor bypass air 240, along the radial interface between diffuser case flange 230 and turbine case flange 232. In this regard, heat shield vane support 300 tends to prevent the relatively hot combustor bypass air 240 from scrubbing the inner surfaces of the diffuser case 224 and the turbine case 226 proximate the flange interface tending thereby to reduce the magnitude of the thermal gradient and tending thereby to improve structural life of the flanges. In various embodiments, a gasket 242 may be coupled between gasket support ring 316 of heat shield vane support 300 and seat feature 244 proximate trailing edge 246 of vanes 210. In various embodiments, heat shield vane support 300 may comprise a flow discouraging rail 318 and combustor bypass air 240 may tend to be restricted toward downstream flow by interference between the flow discouraging rail 318 and the turbine case 226 and by the gasket 242.

Figure 4:
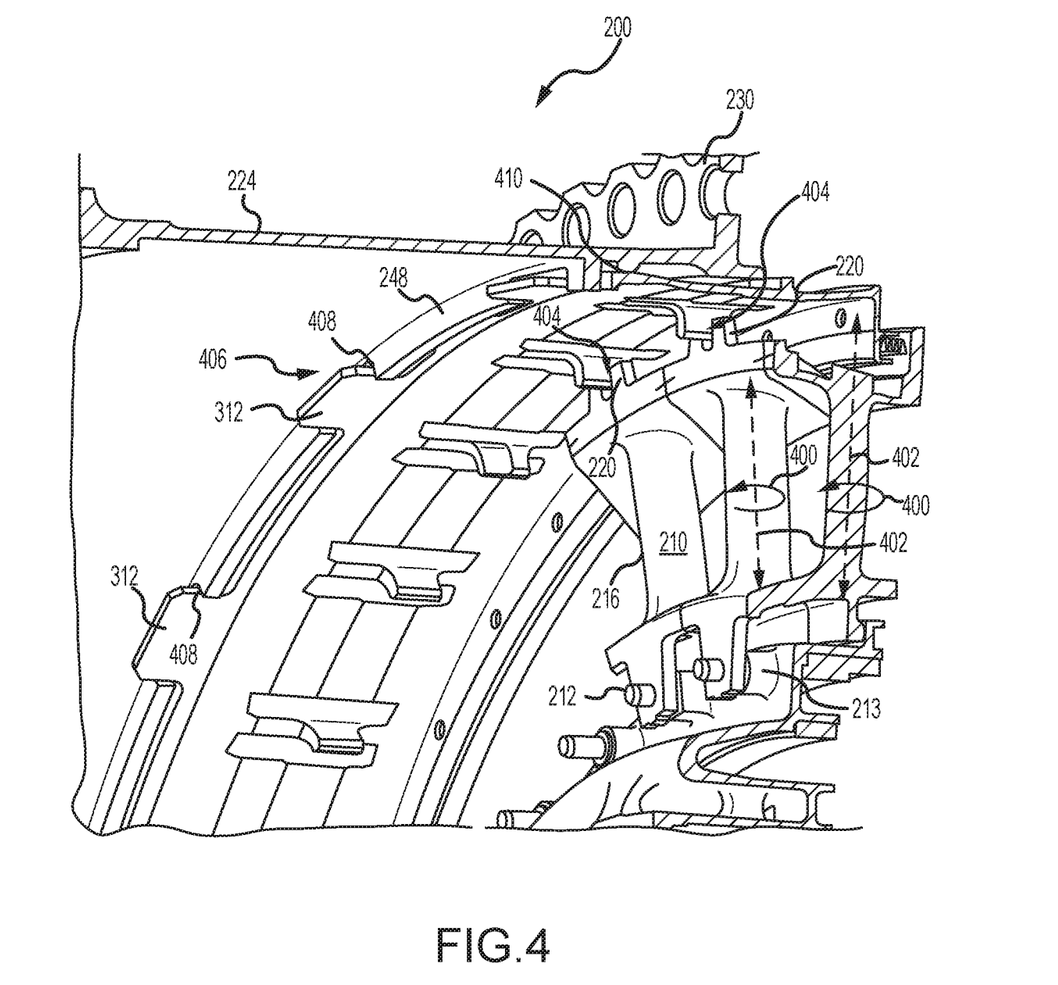
FIG. 4 illustrates a section through a perspective view of a vane assembly, in accordance with various embodiments.

In various embodiments and with additional reference to FIG. 4, vane assembly 200 is shown in perspective with turbine case 226 decoupled from diffuser case 224. Heat shield vane support 300 is inserted forward into diffuser case 224 with forward face 302 proximate the torque takeout ring 248. In various embodiments, the plurality of axial locating features 334 may contact the torque takeout ring 248 tending thereby to locate the heat shield vane support 300 axially with respect to the torque takeout ring 248. In various embodiments, torque takeout ring 248 comprises a plurality of notches 406 axially through the torque takeout ring 248 configured to accept teeth 312 of heat shield vane support 300. In various embodiments and in response to insertion of teeth 312 through notches 406, compression ring 250 tends to compress the cylindrical structure of heat shield vane support 300 tending to form an interference 410 (a first interference) about the circumference of outboard diameter 308 between the compression ring 250 and the outboard diameter 308. In this regard, interference 410 tends to retain heat shield vane support 300 axially with respect to the diffuser case flange 230.

In various embodiments, vane flange 214 may be inserted over pin 212 of support boss 213 and, in response, yoke 220 may be disposed about anti-rotation feature 314. In various embodiments, hot gasses 238 flowing around vanes 210 tend to impart a torque 400 along the radial axis 402 of vanes 210 tending to induce a rotation about the radial axis of the vanes 210. In various embodiments, yoke 220 may contact anti-rotation feature 314 in response to the rotation thereby generating an interference 404 (a second interference) between the yoke 220 and the anti-rotation feature 314 tending to inhibit the rotation of vanes 210 about radial axis 402. In various embodiments, generating interference 404 may tend to cause heat shield vane support 300 to rotate axially with respect to diffuser case 224. In various embodiments and in response to the rotation of heat shield vane support 300, an interference 408 (a third interference) is generated between teeth 312 and notches 406 of torque takeout ring 248 tending to inhibit axial rotation of heat shield vane support 300. In this regard, torque about axis 402 of vanes 210 induced by hot gasses 238 may be transferred via heat shield vane support 300 through torque takeout ring 248 into diffuser case 224.

Figure 5:
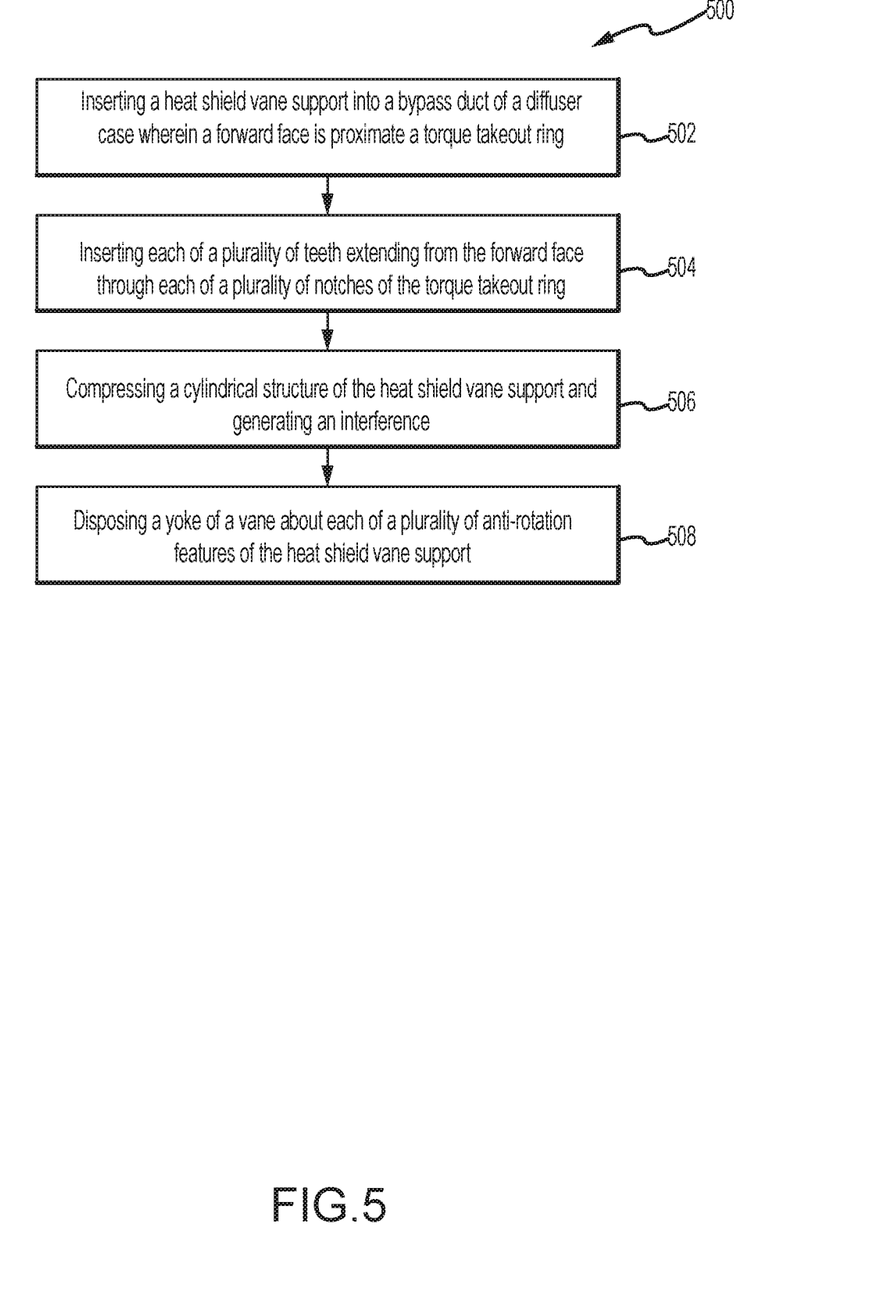
FIG. 5 illustrates a method of assembly a vane assembly, in accordance with various embodiments.

In various embodiments and with reference to FIG. 5, a method 500 of assembling a vane assembly such as vane assembly 200 may comprise inserting a heat shield vane support having a cylindrical structure with an outboard diameter and an inboard diameter extending about an axis and extending axially between a forward face and an aft face into a bypass duct of a diffuser case wherein the forward face is proximate a torque takeout ring (step 502). Method 500 further comprises inserting each of a plurality of teeth extending from the forward face through each of a plurality of notches of the torque takeout ring (step 504). Method 500 further comprises compressing the cylindrical structure of the heat shield vane support and generating an interference retaining the heat shield vane support axially with respect to the diffuser case flange (step 506). Method 500 further includes disposing a yoke of a vane about each of a plurality of anti-rotation features of the heat shield vane support distributed circumferentially about the inboard diameter, wherein the plurality of anti-rotation features extend radially inward from the inboard diameter and extend axially with respect to the cylindrical structure between a forward edge and an aft edge (step 508).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A heat shield vane support having a structure including at least one of a cylindrical portion and a frustoconical portion with an outboard diameter and an inboard diameter extending about an axis and extending axially between a forward face and an aft face, comprising:
   a flange extending circumferentially about the aft face radially inward from the inboard diameter;
   a plurality of anti-rotation features distributed circumferentially about the inboard diameter extending radially inward from the inboard diameter and extending axially with respect to the cylindrical portion between a forward edge and an aft edge; and
   a plurality of teeth distributed circumferentially about the forward face and extending axially from the forward face,
   wherein the plurality of anti-rotation features comprises a first thickness defined between a first channel and a second channel, wherein the first channel and the second channel are cut radially outboard from the inboard diameter toward the outboard diameter, wherein the first channel and the second channel extend axially over a portion of the inboard diameter of the cylindrical portion and parallel the axis.

2. The heat shield vane support of claim 1, wherein a flow discouraging rail extends circumferentially about the aft face radially outward from the outboard diameter.

3. The heat shield vane support of claim 1, wherein the plurality of anti-rotation features comprise a clocking feature proximate the forward edge of the plurality of anti-rotation features, wherein the clocking feature defines a second thickness, wherein the second thickness is less than the first thickness, wherein the clocking feature describes a stepped transition between the first thickness and the second thickness.

4. The heat shield vane support of claim 1, wherein a plurality of tooling features distributed circumferentially about the outboard diameter extend radially from the outboard diameter.

5. The heat shield vane support of claim 4, wherein each tooling feature in the plurality of tooling features extend from a portion of the outboard diameter defined radially outward of the plurality of anti-rotation features.

6. The heat shield vane support of claim 1, wherein the flange comprises a port.

7. The heat shield vane support of claim 1, wherein the flange comprises a gasket support ring at a distal end of the flange from the inboard diameter, wherein the gasket support ring extends circumferentially about the distal end of the flange and axially aft of the flange.

8. A gas turbine engine comprising:
   a compressor section configured to compress a gas;
   a combustor section aft of the compressor section configured to combust the gas and comprising a diffuser case having a diffuser case flange, a torque takeout ring, and a compression ring aft of the torque takeout ring;
   a turbine section aft of the combustor section configured to extract work from the combusted gas, the turbine section having a turbine case coupled to the diffuser case at an interface between the diffuser case flange and a turbine case flange; and
   a heat shield vane support radially inward of the interface between the diffuser case flange and the turbine case flange, the heat shield vane support having a structure including at least one of a cylindrical portion and a frustoconical portion with an outboard diameter and an inboard diameter extending about an axis and extending axially between a forward face and an aft face, comprising:
   a flange extending circumferentially about the aft face radially inward from the inboard diameter;
   a plurality of anti-rotation features distributed circumferentially about the inboard diameter extending radially inward from the inboard diameter and extending axially with respect to the cylindrical portion between a forward edge and an aft edge; and
   a plurality of teeth distributed circumferentially about the forward face and extending axially from the forward face,
   wherein the plurality of anti-rotation features comprises a first thickness defined between a first channel and a second channel, wherein the first channel and the second channel are cut radially outboard from the inboard diameter toward the outboard diameter, wherein the first channel and the second channel extend axially over a portion of the inboard diameter of the cylindrical portion and parallel the axis.

9. The gas turbine engine of claim 8, wherein a flow discouraging rail extends circumferentially about the aft face radially outward from the outboard diameter.

10. The gas turbine engine of claim 9, wherein the plurality of anti-rotation features comprise a clocking feature proximate the forward edge of the plurality of anti-rotation features, wherein the clocking feature defines a second thickness, wherein the second thickness is less than the first thickness, wherein the clocking feature describes a stepped transition between the first thickness and the second thickness.

11. The gas turbine engine heat shield vane support of claim 8, wherein a plurality of tooling features distributed circumferentially about the outboard diameter extend radially from the outboard diameter.

12. The gas turbine engine of claim 11, wherein each tooling feature in the plurality of tooling features extend from a portion of the outboard diameter defined radially outward of the plurality of anti-rotation features.

13. The gas turbine engine of claim 8, wherein the flange comprises a port.

14. The gas turbine engine of claim 8, wherein the flange comprises a gasket support ring at a distal end of the flange from the inboard diameter, wherein the gasket support ring extends circumferentially about the distal end of the flange and axially aft of the flange.

15. The gas turbine engine of claim 8, wherein each of the plurality of teeth are disposed within a notch of the torque takeout ring.

16. The gas turbine engine of claim 8, wherein a first interference between the compression ring and the outboard diameter tends to retain the heat shield vane support axially with respect to the diffuser case flange.

17. The gas turbine engine of claim 8, wherein a yoke of a vane is disposed about each of the plurality of anti-rotation features, wherein a second interference between the yoke and each of the plurality of anti-rotation features inhibits rotation of the vane about a radial axis of the vane.

18. A method of assembling a vane assembly, the method comprising:
- inserting a heat shield vane support having a structure including at least one of a cylindrical portion and a frustoconical portion with an outboard diameter and an inboard diameter extending about an axis and extending axially between a forward face and an aft face into a bypass duct of a diffuser case having a diffuser case flange, wherein the forward face is proximate a torque takeout ring, wherein the diffuser case flange lies between the forward face and the aft face and radially outward of the outboard diameter;
- inserting each of a plurality of teeth extending from the forward face through each of a plurality of notches of the torque takeout ring;
- compressing the cylindrical portion of the heat shield vane support and generating an interference retaining the heat shield vane support axially with respect to the diffuser case flange; and
- disposing a yoke of a vane about each of a plurality of anti-rotation features of the heat shield vane support distributed circumferentially about the inboard diameter, wherein the plurality of anti-rotation features extend radially inward from the inboard diameter and extend axially with respect to the cylindrical portion between a forward edge and an aft edge, wherein the plurality of anti-rotation features comprises a first thickness defined between a first channel and a second channel, wherein the first channel and the second channel are cut radially outboard from the inboard diameter toward the outboard diameter, wherein the first channel and the second channel extend axially over a portion of the inboard diameter of the cylindrical portion and parallel the axis.

* * * * *